US011935207B2

United States Patent
Jain et al.

(10) Patent No.: US 11,935,207 B2
(45) Date of Patent: Mar. 19, 2024

(54) SPACING GUIDES FOR OBJECTS IN PERSPECTIVE VIEWS

(71) Applicant: Adobe Inc., San Jose, CA (US)

(72) Inventors: Ashish Jain, Ashok Vihar (IN); Arushi Jain, Ashok Vihar (IN)

(73) Assignee: Adobe Inc., San Jose, CA (US)

( * ) Notice: Subject to any disclaimer, the term of this patent is extended or adjusted under 35 U.S.C. 154(b) by 155 days.

(21) Appl. No.: 17/858,262

(22) Filed: Jul. 6, 2022

(65) Prior Publication Data
US 2024/0013494 A1    Jan. 11, 2024

(51) Int. Cl.
*G06T 19/20*        (2011.01)
*G06T 15/20*        (2011.01)

(52) U.S. Cl.
CPC .............. *G06T 19/20* (2013.01); *G06T 15/20* (2013.01); *G06T 2200/24* (2013.01); *G06T 2210/12* (2013.01); *G06T 2219/2004* (2013.01); *G06T 2219/2021* (2013.01)

(58) Field of Classification Search
None
See application file for complete search history.

(56) References Cited

U.S. PATENT DOCUMENTS

| | | | |
|---|---|---|---|
| 6,771,276 B1 * | 8/2004 | Highsmith | G06T 15/20 345/619 |
| 2014/0354548 A1 * | 12/2014 | Lee | G06F 3/0321 345/166 |
| 2017/0116778 A1 * | 4/2017 | Lee | G06T 7/536 |
| 2017/0221236 A1 * | 8/2017 | Dowd | G06F 3/04847 |
| 2020/0226805 A1 * | 7/2020 | Szeliski | G06V 10/443 |
| 2021/0090352 A1 * | 3/2021 | Park | G06T 7/60 |
| 2023/0245373 A1 * | 8/2023 | Xiong | G06T 15/205 345/419 |

* cited by examiner

Primary Examiner — Frank S Chen
(74) Attorney, Agent, or Firm — FIG. 1 Patents

(57) ABSTRACT

In implementations of systems for generating spacing guides for objects in perspective views, a computing device implements a guide system to determine groups of line segments of perspective bounding boxes of objects displayed in a user interface of a digital content editing application. Interaction data is received describing a user interaction with a particular object of the objects displayed in the user interface. The guide system identifies a particular group of the groups of line segments based on a line segment of a perspective bounding box of the particular object. An indication of a guide is generated for display in the user interface based on the line segment and a first line segment included in the particular group.

20 Claims, 13 Drawing Sheets

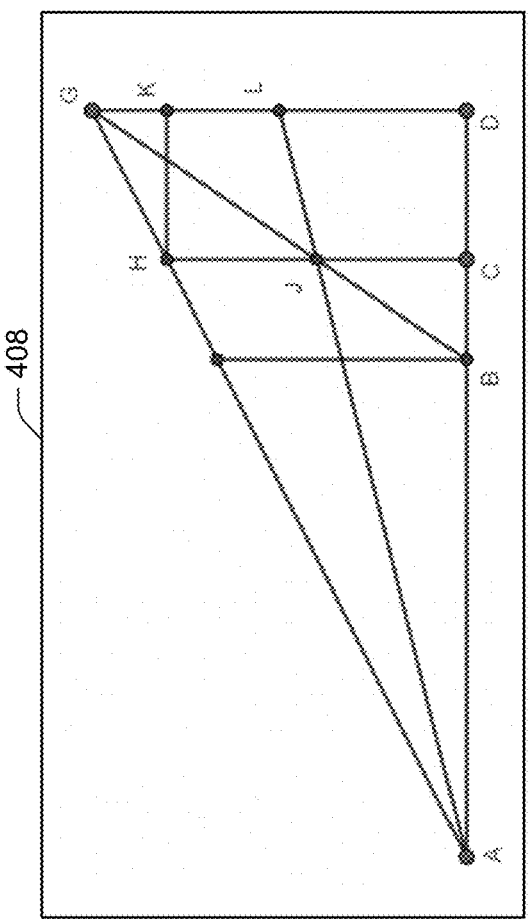
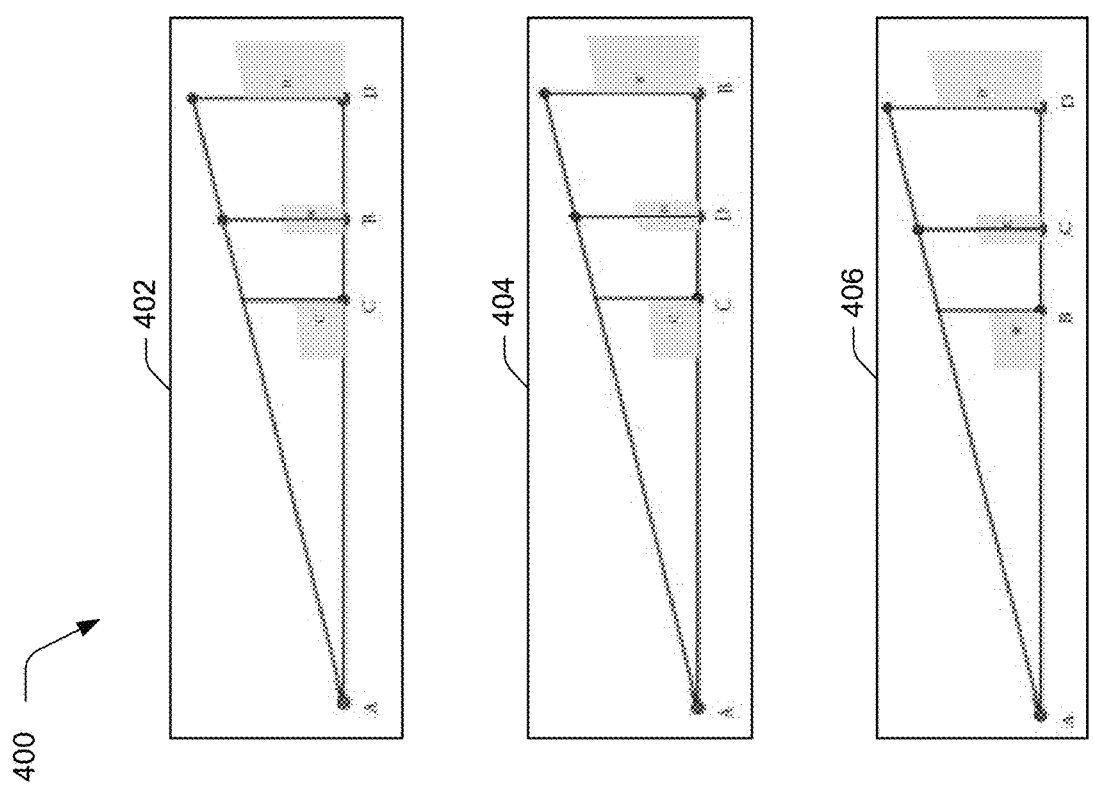
Fig. 4

600

602
Determine groups of line segments of perspective bounding boxes of objects displayed in a user interface of a digital content editing application

604
Receive interaction data describing a user interaction with a particular object of the objects displayed in the user interface

606
Identify a particular group of the groups of line segments based on a line segment of a perspective bounding box of the particular object

608
Generate an indication of a guide for display in the user interface based on the line segment and a first line segment included in the particular group

*Fig. 6*

SPACING GUIDES FOR OBJECTS IN PERSPECTIVE VIEWS

BACKGROUND

Digital artwork having a perspective view depicts two-dimensional objects and partial backgrounds which appear to have a depth. The apparent depth is a result of lines and edges that converge and end at points called vanishing points which reproduce a visual effect of perceiving parallel lines that appear to converge far away from an observer's point of view. For example, digital artwork rendered in a user interface depicts a perspective view of railroad tracks which appear to converge at a vanishing point of a background that depicts a sunset. In order for three consecutive objects depicted in the digital artwork such as three consecutive signposts to appear equally spaced in the perspective view of the railroad tracks, the three consecutive signposts are spaced unequally in the user interface such that a distance between a middle signpost and a closest signpost to the vanishing point is less than a distance between the middle signpost and a furthest signpost from the vanishing point in the user interface.

Content creation applications of conventional systems facilitate spacing of objects in digital artwork having a perspective view using perspective grids which have grid elements oriented in relation to a vanishing point or a line or edge intersecting the vanishing point as depicted in the digital artwork. For instance, a perspective grid is usable to visualize spacing in the perspective view, display indications of alignment between objects in the perspective view, snap object boundaries to align with elements of the perspective grid, and so forth. However, conventional systems are not capable of displaying indications of relative spacing between objects in perspective views unless the objects happen to align with elements of the perspective grid which is a shortcoming of conventional systems.

SUMMARY

Techniques and systems for generating spacing guides for objects in perspective views are described. In one example, a computing device implements a guide system to determine groups of line segments of perspective bounding boxes of objects displayed in a user interface of a digital content editing application. For example, the line segments intersect a central line passing through a vanishing point at different angles, and the guide system determines the groups of line segments based on the different angles.

The guide system receives interaction data describing a user interaction with a particular object of the objects displayed in the user interface. A particular group is identified of the groups of line segments based on a line segment of a perspective bounding box of the particular object. The guide system generates an indication of a guide for display in the user interface based on the line segment and a first line segment included in the particular group.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 4 illustrates a representation of determining a perspective distance based on a known distance.

FIG. 6 is a flow diagram depicting a procedure in an example implementation in which groups of line segments of perspective bounding boxes are determined and an indication of a guide is generated for display in a user interface.

DETAILED DESCRIPTION

Overview

Figure 1:
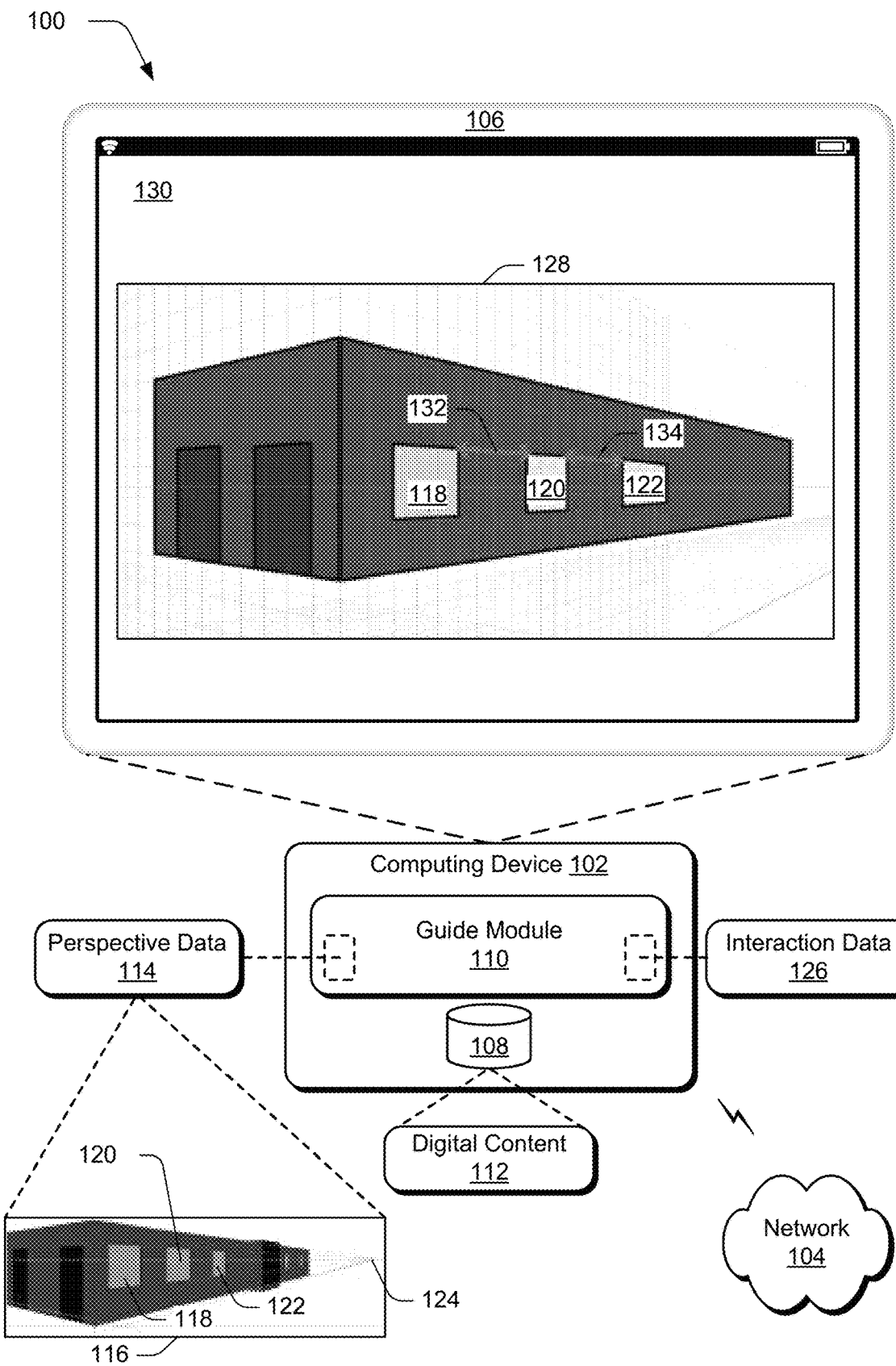
FIG. 1 is an illustration of an environment in an example implementation that is operable to employ digital systems and techniques for generating spacing guides for objects in perspective views as described herein.

Content creation applications of conventional systems are not capable of displaying indications of relative spacing between objects depicted in perspective views of digital artwork which is a shortcoming of conventional systems. In order to overcome the limitations of conventional systems, techniques and systems are described for generating spacing guides for objects in perspective views. In an example, a computing device implements a guide system to receive perspective data describing objects depicted in digital artwork having a perspective view displayed in a user interface of a digital content editing application. The guide system processes the perspective data to identify line segments of perspective bounding boxes of the objects and then determines angles between the identified line segments and a central line passing through a vanishing point of the perspective view depicted in the digital artwork.

For example, the guide system determines groups of line segments based on the angles between the identified line segments and the central line such that line segments of the perspective bounding boxes included in each group of the groups of line segments intersect the central line at similar angles. The guide system receives interaction data describing a user interaction with a particular object of the objects displayed in the user interface. For instance, the user interacts with an input device (e.g., a stylus, a mouse, a touchscreen, etc.) relative to the user interface to manipulate the particular object relative to additional objects depicted in the digital artwork, and the guide system receives the interaction data from the input device.

The guide system processes the interaction data to identify a line segment of a perspective bounding box of the particular object and determines an angle between the line segment and the central line passing through the vanishing point. In one example, the guide system determines a particular group of the groups of line segments that includes the determined angle. In this example, the guide system compares perspective distances between the line segment, line segments included in the particular group, and line segments of perspective bounding boxes of objects within a threshold distance (e.g., a snapping threshold) from coordinates of the line segment in the user interface.

The perspective distances are not necessarily equivalent to distances in the user interface. For example, a first perspective distance between a first object and a second object that is closer than the first object to the vanishing point is equivalent to a second perspective distance between the second object and a third object that is closer to the vanishing point than the second object even though a distance in the user interface between the first and second objects is greater than a distance in the user interface between the second and third objects. In one example, the guide system computes the perspective distances based on known distances in the user interface and geometric relationships between the known distances and the perspective distances.

The guide system compares the perspective distances between the line segment of the perspective bounding box of the particular object and the line segments of the perspective bounding boxes of other objects displayed in the user interface to determine whether the particular object is disposed in between a first object and a second object such that the first object and the second object are each an equivalent perspective distance from the particular object (e.g., from a midpoint of the particular object). The guide system also compares the perspective distances to determine whether the particular object is disposed on one side of the first object and the second object such that the particular object is a perspective distance from the first object and the first object is an equivalent perspective distance from the second object. In response to either determination, the guide system generates an indication of a guide for display in the user interface. The guide indicates equivalent perspective distances between the particular object and two additional objects displayed in the user interface which is not possible using conventional systems that are limited to displaying a perspective grid for object spacing in perspective views.

In the following discussion, an example environment is first described that employs examples of techniques described herein. Example procedures are also described which are performable in the example environment and other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 is configurable as a desktop computer, a laptop computer, a mobile device (e.g., assuming a handheld configuration such as a tablet or mobile phone), and so forth. Thus, the computing device 102 is capable of ranging from a full resource device with substantial memory and processor resources (e.g., personal computers, game consoles) to a low-resource device with limited memory and/or processing resources (e.g., mobile devices). In some examples, the computing device 102 is representative of a plurality of different devices such as multiple servers utilized to perform operations "over the cloud."

The illustrated environment 100 also includes a display device 106 that is communicatively coupled to the computing device 102 via a wired or a wireless connection. A variety of device configurations are usable to implement the computing device 102 and/or the display device 106. The computing device 102 includes a storage device 108 and a guide module 110. The storage device 108 is illustrated to include digital content 112 such as digital images, graphic artwork, digital videos, etc.

For instance, the guide module 110 is illustrated as having, receiving, and/or transmitting perspective data 114 which describes digital artwork 116 that depicts objects 118-122 in a perspective view. As shown, the digital artwork 116 depicts a corner of a building which is defined by lines and edges that appear to converge at a vanishing point 124. This causes the building depicted in in the digital artwork 116 to appear three-dimensional as having a spatial depth. For example, object 118 depicts a first window of the building, object 120 depicts a second window of the building, and object 122 depicts a third window of the building.

The guide module 110 processes the perspective data 114 to identify line segments of perspective bounding boxes of the objects 118-122 and also to identify line segments of perspective bounding boxes of other objects depicted in the digital artwork 116. The identified line segments of the perspective bounding boxes are projectable to form an angle with a central line passing through the vanishing point 124, and the guide module 110 leverages these angles and distances from corresponding line segments to the vanishing point 124 to group the identified line segments of the perspective bounding boxes into groups or bins of similar line segments. In one example, the guide module 110 processes the perspective data 114 to determine bins or groups of the line segments of the perspective bounding boxes based on angles of intersection between the line segments and the central line passing through the vanishing point 124 of the digital artwork 116. In this example, the guide module 110 leverages a snapping tolerance of an application for editing digital content to compute a tolerance angle which defines a number of the groups, and the guide module 110 maps the line segments to the groups based on the angles of intersection between the line segments and the central line passing through the vanishing point 124. For instance, after the guide module 110 maps the line segments to the groups, particular line segments of the line segments included in a particular group of the groups have similar angles with respect to the central line passing through the vanishing point 124.

In the illustrated example, the guide module 110 is depicted as having, receiving, and/or transmitting interaction data 126 that describes a user interaction with the object 118 depicted in the digital artwork 116. For example, the user interacts with an input device (e.g., a mouse, a stylus, a touchscreen, etc.) to manipulate the object 118 in the digital artwork 116. In this example, the guide module 110 receives the interaction data 126 describing the interaction with the object 118, and the guide module 110 processes the interaction data 126 to identify a line segment or line segments of a perspective bounding box of the object 118. Continuing this example, the guide module 110 determines an angle between the line segment of the perspective bounding box of the object 118 and the central line passing through the vanishing point 124.

In an example, the guide module 110 processes the perspective data 114 to identify a group of the groups of line segments that includes the determined angle between the line segment of the perspective bounding box of the object 118 and the central line. For instance, line segments of perspective bounding boxes that are included in the identified group are candidates for spacing guides, and the guide module 110 compares coordinates of these line segments with each other as well as with coordinates of the line segment to determine whether the line segment is equally spaced between a first line segment and a second line segment in the perspective view. Next, the guide module 110 determines whether the first line segment and the second line segment are separated by a particular distance in the digital artwork 116 and whether the line segment is on one side of the first line segment and the second line segment such that a distance between the line segment and either the first line segment or the second line segment is equal to the particular distance in the perspective view.

Consider an example in which the guide module 110 determines that a line segment of a perspective bounding box of the object 122 is spaced a particular perspective distance from a line segment of a perspective bounding box of the object 120. In this example, the guide module 110 also determines that the line segment of the perspective bounding box of the object 118 is spaced the particular perspective distance from the line segment of the perspective bounding box of the object 120. Continuing the example, the guide module 110 leverages the particular perspective distance to render an example 128 which is displayed in a user interface 130 of the display device 106.

As shown, the example 128 includes a spacing guide 132 that indicates a right side of the object 118 (e.g., the line segment of the perspective bounding box of the object 118) is the particular perspective distance from a left side of the object 120 (e.g., the line segment of the perspective bounding box of the object 120). The example 128 also includes a spacing guide 134 that indicates a right side of the object 120 (e.g., an additional line segment of the perspective bounding box of the object 120) is the particular perspective distance from a left side of the object 122 (e.g., the line segment of the perspective bounding box of the object 122). For example, although the spacing guides 132, 134 are equivalent distances or lengths in the perspective view, the spacing guides 132, 134 are not a same distance or length in the user interface 130. Rather, a length of the spacing guide 132 in the user interface 130 is greater than a length of the spacing guide 134 in the user interface 130. This is because the spacing guide 134 is closer to the vanishing point 124 than the spacing guide 132 in the user interface 130.

Consider an additional example in which the user interacts with the input device to manipulate the object 120 in the digital artwork 116 instead of manipulating the object 118. In this example, the guide module 110 receives the interaction data 126 as describing the interaction with the object 120, and the guide module 110 processes the interaction data 126 and/or the perspective data 114 to generate the spacing guides 132, 134 for display in the user interface 130. To do so in one example, the guide module 110 identifies a line segment or line segments of the perspective bounding box of the object 120 and determines an angle at which the line segment of the perspective bounding box intersects the central line passing through the vanishing point 124. For instance, the guide module 110 determines a group of the groups of line segments that includes the determined angle and compares coordinates of line segments of perspective bounding boxes that are included in the determined group with each other and also with coordinates of the line segment of the perspective bounding box of the object 120 to determine whether the object 120 is equally spaced between the object 118 and the object 122 in the digital artwork 116.

In one example, the guide module 110 determines whether a midpoint of the object 120 is equally spaced between the right side of the of object 120 and the left side of the object 122. For example, the guide module 110 determines that the left side of the object 120 is spaced a particular perspective distance from the right side of the object 118 and that the right side of the object 120 is spaced the particular perspective distance from the left side of the object 122. The guide module 110 generates the spacing guide 132 as indicating that the right side of the object 118 (e.g., the line segment of the perspective bounding box of the object 118) is the particular perspective distance from the left side of the object 120 (e.g., the line segment of the perspective bounding box of the object 120). Similarly, the guide module 110 generates the spacing guide 134 as indicating that the right side of the object 120 (e.g., the additional line segment of the perspective bounding box of the object 120) is the particular perspective distance from the left side of the object 122 (e.g., the line segment of the perspective bounding box of the object 122).

Consider another example in which the user interacts with the input device to manipulate the object 122 in the digital artwork 116 instead of manipulating the object 118 or the object 120. For example, the guide module 110 receives the interaction data 126 as describing the interaction with the object 122, and the guide module 110 identifies an angle between the line segment of the perspective bounding box of the object 122 and the central line passing through the vanishing point 124 in the digital artwork 116. As in the previous examples, the guide module 110 determines a group of the groups of line segments of the perspective bounding boxes that includes the identified angle. For instance, the guide module 110 compares coordinates of line segments of perspective bounding boxes that are included in the determined group with each other and with coordinates of the line segment of the bounding box of the object 122 to determine whether a perspective distance between the object 120 and the object 122 is equivalent to a perspective distance between the object 118 and the object 120.

In an example, the guide module 110 generates the spacing guide 134 to indicate that the left side of the object 122 (e.g., the line segment of the perspective bounding box of the object 122) is a specific perspective distance from the right side of the object 120 (e.g., the additional line segment of the perspective bounding box of the object 120). In this example, the guide module 110 generates the spacing guide 132 to indicate that the left side of the object 120 (e.g., the line segment of the perspective bounding box of the object 120) is the specific perspective distance from the right side of the object 118 (e.g., the line segment of the perspective bounding box of the object 118). As in the previous examples, even though the spacing guides 132, 134 have the equivalent length in the perspective view, the spacing guides 132, 134 do not have the equivalent length in the user interface 130 because the spacing guide 134 is closer to the vanishing point 124 than the spacing guide 132. For instance, when the spacing guides 132, 134 indicate equivalent perspective distances between the objects 118, 120 and the objects 120, 120, the objects 118, 120 are separated by about four grid elements of a perspective grid displayed in the user interface 130 and the objects 120, 122 are separated by about five grid elements of the perspective grid.

Figure 2:
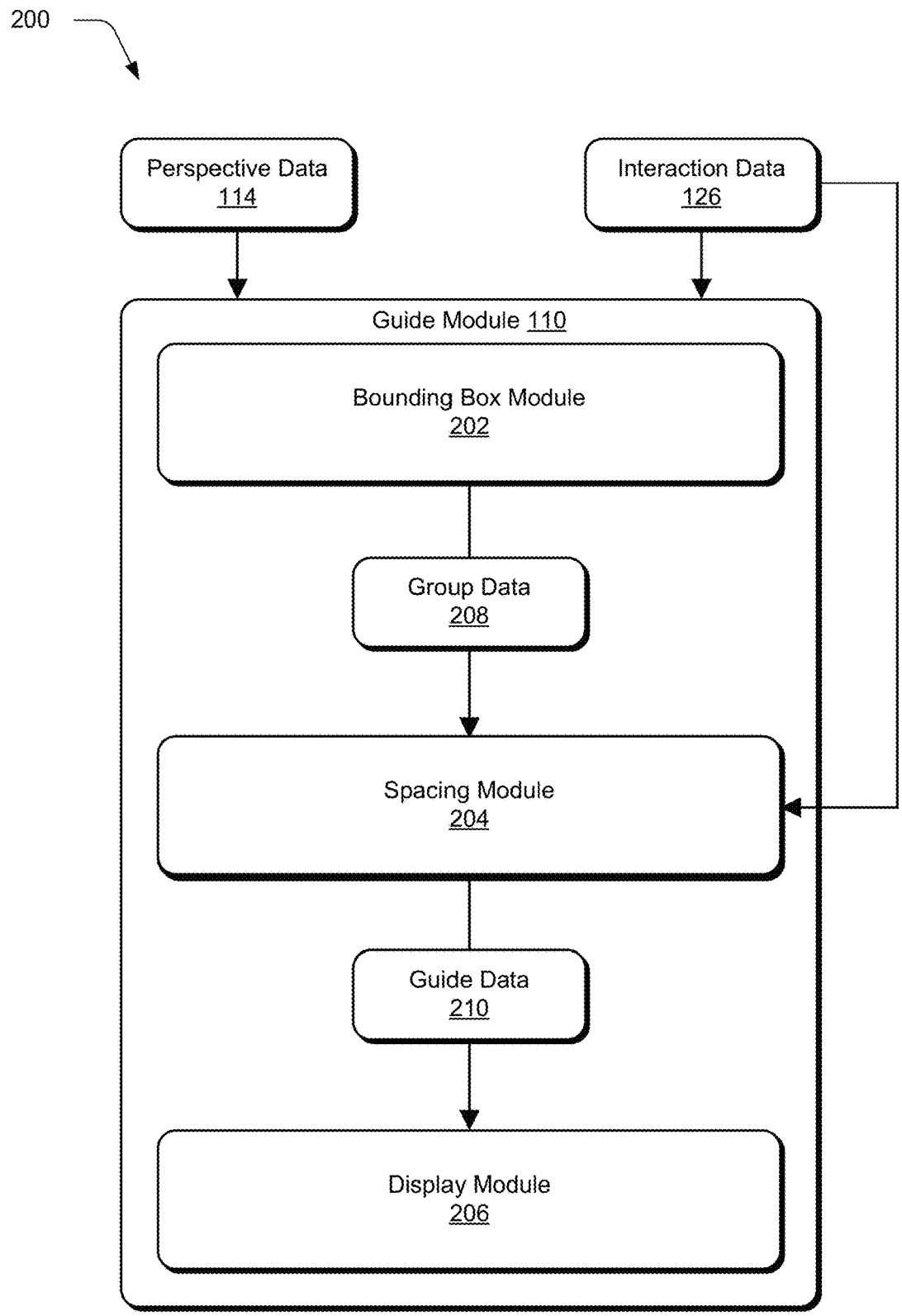
FIG. 2 depicts a system in an example implementation showing operation of a guide module for generating spacing guides for objects in perspective views.

FIG. 2 depicts a system 200 in an example implementation showing operation of a guide module 110. The guide module 110 is illustrated to include a bounding box module 202, a spacing module 204, and a display module 206. In one example, the bounding box module 202 receives and processes the perspective data 114 to generate group data 208.

Figure 3:
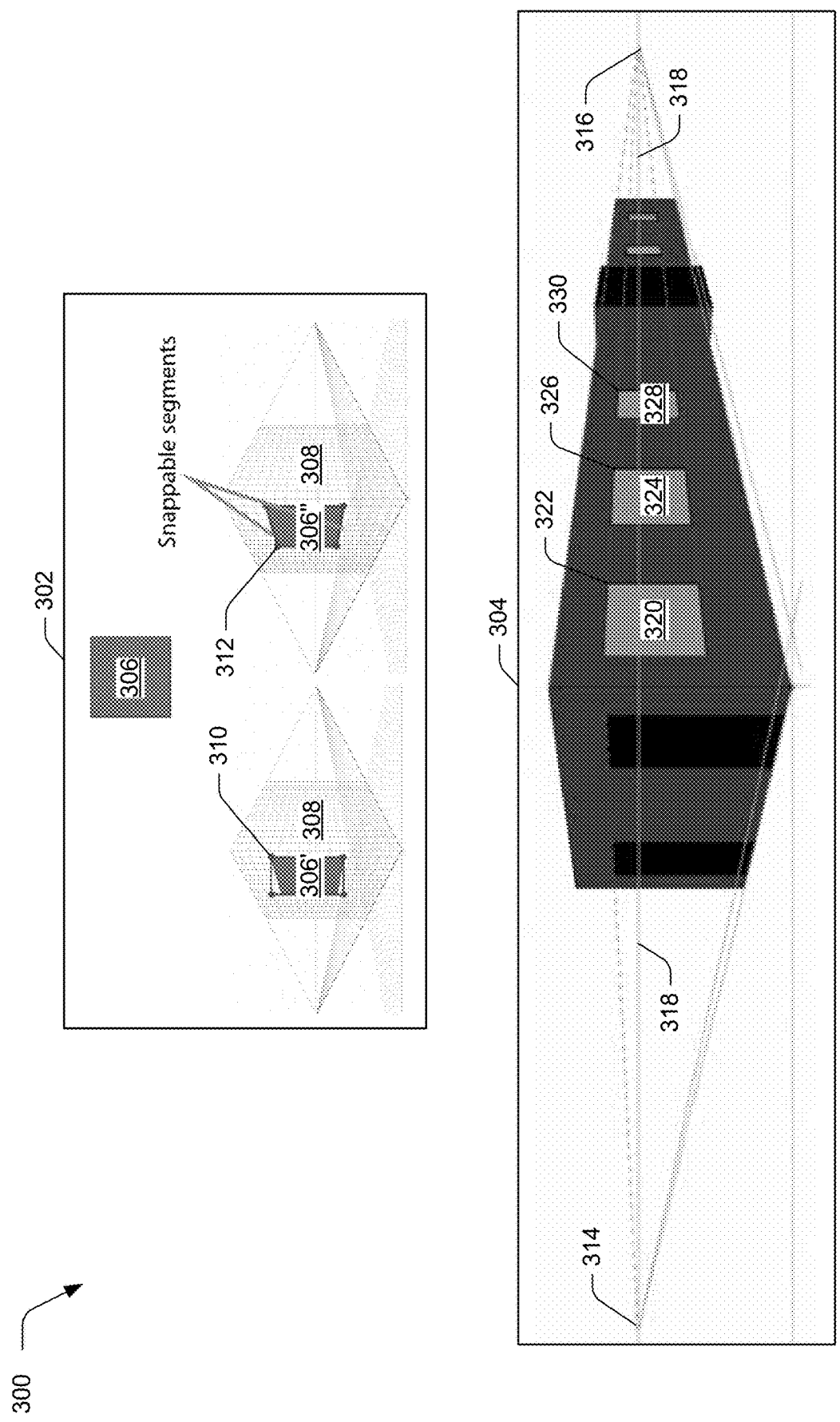
FIG. 3 illustrates a representation of line segments of perspective bounding boxes of objects in a perspective view.

FIG. 3 illustrates a representation 300 of line segments of perspective bounding boxes of objects in a perspective view. As shown, the representation 300 includes a perspective bounding box example 302 and a digital artwork example 304. For instance, the bounding box module 202 receives the perspective data 114 as describing the representation 300, and the bounding box module 202 processes the perspective data 114 to determine groups of line segments of perspective bounding boxes of objects included in the digital artwork example 304.

The perspective bounding box example 302 includes an object 306 which has a square shaped geometry and a solid color fill. The object 306 is also presented in a first perspective orientation 306' using a perspective grid 308 of an application for editing digital content. In the first perspective orientation 306' the object has a bounding box 310 which is not aligned with the perspective grid 308. As shown, the object 306 is also presented in a second perspective orientation 306" using the perspective grid 308. In the second perspective orientation 306", the object has a perspective bounding box 312 which is aligned with the perspective grid 308. As a result, line segments of the perspective bounding box 312 are extractable as snappable segments which the bounding box module 202 maps to groups of line segments of perspective bounding boxes such each of the groups includes similarly oriented line segments of perspective bounding boxes.

In an example, this is representable as:
procedure KEY (Angle)

$$key \leftarrow \frac{Angle}{A}$$

return integer part of key
procedure INSERTION(l,B)
m←angle of l w.r.t. central line passing through a vanishing point
Q←KEY(m)
Add 1 in B[Q]
procedure PERSPECTIVE ALIGNMENT BIN CREATION
B is alignment bin map with values of locations whose angle lies in that bin
for each $l_i$ in S do
INSERTION($l_i$,B)
for each angle Q in B do
S←B[Q]
sort S based on angle of line segments from the vanishing point
sort S on basis of distance from the vanishing point for equal angles
return B
where: A represents a tolerance angle which is determined based on a snapping tolerance ∈; and an additional input includes a list of snappable segments of perspective bounding boxes in S.

For example, using the alignment bin map, the bounding box module 202 extracts out line segments of perspective bounding boxes which are within a tolerance zone of a movable object that the user manipulates via interaction with the input device. For example, this is representable as:
procedure EXTRACT SEGMENTS IN TOLERANCE ZONE (s,B)
for each line segment l representing a side of perspective bounding box of S do
SegmentsInToleranceZone=Empty
Ang=Angle with central line passing through vanishing point
Bin B=Alignment Bin in which l lies based on its angle Ang
SegmentsInToleranceZone+=
All the snappable segments in bin B, bin just before B, and bin just after B
SORTING AND SEGREGATING (SegmentsInToleranceZone,s)

The bounding box module 202 determines three possible scenarios for equal spacing alignment in a perspective view. First, the movable object which the user manipulates via interaction with the input device is disposed between two other objects at equal distances. Second and third, two objects are disposed on a same side of the movable object which the user manipulates via interaction with the input device such that one of the two objects is disposed a perspective distance from the other of the two objects and the movable object is disposed an equivalent perspective distance from one of the two objects.

For example, the bounding box module 202 sorts and segregates the segments which is representable as:
procedure SORTING AND SEGREGATING
sort and segregate the input segment in tolerance zone such that:
Left list—this list contains all the perspective bounding box segments of all the objects in the perspective environment that are sorted based on the distance of their right side from the vanishing point
Right list—this list contains all the perspective bounding box segments of all the objects in the perspective environment that are sorted based on the distance of their left side from the vanishing point For example, the bounding box module 202 processes the perspective data 114 to identify vanishing points 314, 316 in the in the digital artwork example 304. In the illustrated example, lines and edges depicted in the digital artwork example 304 appear to converge at the vanishing points 314, 316 which causes a building depicted in the digital artwork example 304 to have a three-dimensional appearance. As shown, a central line 318 passes through the vanishing points 314, 316 in the digital artwork example 304.

The digital artwork example 304 also includes an object 320 having a perspective bounding box 322; an object 324 having a perspective bounding box 326; and an object 328 having a perspective bounding box 330. For instance, the bounding box module 202 determines angles at which line segments of the perspective bounding box 322 intersect the central line 318 as well as distances of the line segments of the perspective bounding box 322 from the vanishing point 316. Similarly, the bounding box module 202 determines angles at which line segments of the perspective bounding box 326 intersect the central line 318 and also determines distances of the line segments of the perspective bounding box 326 from the vanishing point 316. Additionally, the bounding box module 202 determines angles at which line segments of the perspective bounding box 330 intersect the central line 318 and distances of the line segments of the perspective bounding box 330 from the vanishing point 316.

Consider an example in which the bounding box module 202 is capable of leveraging the angles at which the line segments of the perspective bounding boxes 322, 326 intersect the central line 318 to identify spacing guides to display relative to the objects 320, 324 in response to receiving the interaction data 126 as describing a user interaction with the object 328. In this example, the bounding box module 202 compares angles at which line segments of the perspective bounding box 330 intersect the central line 318 with the angles at which the line segments of the perspective bounding boxes 322, 326 intersect the central line 318 to determine that the objects 320, 324, 328 are aligned in a perspective plane. Continuing this example, the bounding box module 202 compares distances of line segments of the perspective bounding box 330 from the vanishing point 316 with the distances of line segments of the perspective bounding boxes 322, 326 from the vanishing point 316 to determine that the object 324 is disposed on a left side of the object 328 and that the object 320 is disposed on a left side of the object 324. In one example, the guide module 110 generates a first spacing guide between the object 320 and the object 324 and a second spacing guide between the object 324 and the object 328 in response to determining that a perspective distance between the objects 320, 324 is equivalent to a perspective distance between the objects 324, 328.

For example, the bounding box module 202 determines groups of line segments from the line segments of the perspective bounding boxes 322, 326, 330 based on the angles at which the line segments of the perspective bounding boxes 322, 326, 330 intersect the central line 318 and based on the distances from the line segments of the perspective bounding boxes 322, 326, 330 to the vanishing point 316. In this example, the bounding box module 202 generates the group data 208 as describing the groups of line segments. The spacing module 204 receives the group data 208 and the interaction data 126 and the spacing module 204 processes the group data 208 and/or the interaction data 126 to generate guide data 210.

FIG. 4 illustrates a representation 400 of determining a perspective distance based on a known distance. The representation 400 includes examples 402-406 in which the vanishing point 316 is represented by point A and the objects 320, 324, 328 are represented by variations of points B, C, and D. Each of the examples 402-406 represents a different type of scenario for generating spacing guides for objects in perspective views. For instance, example 402 represents a type of scenario in which a subject object being manipulated by the user is equally spaced between two other objects in the perspective view. Example 404 represents a type of scenario in which the subject object being manipulated by the user is disposed on a right side of the two other objects in the perspective view. Example 406 represents a type of scenario in which the subject object being manipulated by the user is disposed on a left side of the two other objects in the perspective view.

With respect to the example 406, point B represents the object 320, point C represents the object 324, and point D represents the object 328. The spacing module 204 determines a length between point B and point C such that points B, C, and D (and corresponding objects 320, 324, and 328) are equidistant in the perspective view. To do so in one example, the spacing module 204 generates a modified example 408 by adding a line to the example 406 that passes through point A, intersects line HC at point J, and intersects line GD at point L. The spacing module 204 adds an additional line to the example 406 to generate the modified example 408 that passes through point G and point J (e.g., such that point J is a midpoint of line CH). As shown, the additional line added to the example 406 in the modified example 408 intersects line AD at point B.

With reference to the modified example 408, the spacing module 204 determines that triangle BDG is similar to triangle BCJ and based on the similarity of these triangles:

$$\frac{DG}{BC+CD} = \frac{CJ}{BC}$$

Solving for BC yields:

$$BC = \frac{CJ*CD}{DG-CJ}$$

However:

$$CJ = \frac{CH}{2}$$

$$CH = DG - KG$$

Since triangle ADG is similar to triangle HKG:

$$\frac{AD}{DG} = \frac{HK}{KG} = \frac{CD}{KG}$$

If follows that:

$$KG = \frac{DG*CD}{AD}$$

Inserting the above relationship in the formula for CJ yields:

$$CJ = \frac{DG(AD-CD)}{2*AD}$$

Finally, this simplifies to:

$$BC = \frac{(AD-CD)}{(AD+CD)}*CD$$

The spacing module 204 leverages the geometrical relationships described above to determine equivalent perspective distances in the perspective view. Using the group data 208 that describes the groups of line segments and the interaction data 126 that describes the user interaction with one of the objects 320, 324, 328, the spacing module 204 generates spacing guides for the objects 320, 324, 328 for equal spacing on both sides and equal spacing on one side. For example, this is representable as:

procedure ALGORITHM FOR EQUAL SPACING ON BOTH SIDES
Calculate distance of moving segment S from a vanishing point
CurrLeftList=using binary search, find all segments that lie on a left side of moving segment S
CurrRightList=using binary search, find all segments that lie on aright side of moving segment S for each segment L in CurrLeftList do calculate distance of segment's right side with moving segment's left side segment R=use binary search to find any segments in CurrRightList on the right side of moving segment S such that the distance matches an equivalent perspective distance computed above if any segment R is identified corresponding to segment L return both segments L and R w.r.t. segment S procedure ALGORITHM FOR EQUAL SPACING ON ONE SIDE
Calculate distance of moving segment S from a vanishing point
CurrLeftList=using binary search, find all segments that lie on a left side of moving segment S for each segment M in CurrLeftList do calculate distance of segment's right side with moving segment's left side
segment L=use binary search to find any segments in CurrLeftList only such that a distance to any segment's right side is twice a distance computed using an equivalent perspective distance if any segment L is identified corresponding to segment M return both segments L and M w.r.t. segment R if no segment L is identified corresponding to segment M, then repeat above steps for segment M using CurrRightList only such that a distance to any segment's left side is twice a distance computed using an equivalent perspective distance and return both segments R and M w.r.t. segment L For example, the spacing module 204 generates the guide data 210 as describing the spacing guides generated for the objects 320, 324, 328 for equal spacing on both sides of the objects 320, 324, 328 and equal spacing on one side of the objects 320, 324, 328. The display module 206 receives and processes the guide data 210 to snap one of the perspective bounding boxes 322, 326, 330 that corresponds to one of the objects 320, 324, 328 which is being manipulated by the user to other ones of the perspective bounding boxes 322, 326, 330 such that the objects 320, 324, 328 align collinearly and equally spaced relative to each other in the user interface 130. In an example, the display module 206 processes the guide data 210 to generate indications of equal spacing hints for display in the user interface 130 after performing the snapping based on the one of the objects 320, 324, 328 which is being manipulated by the user.

Figure 5:
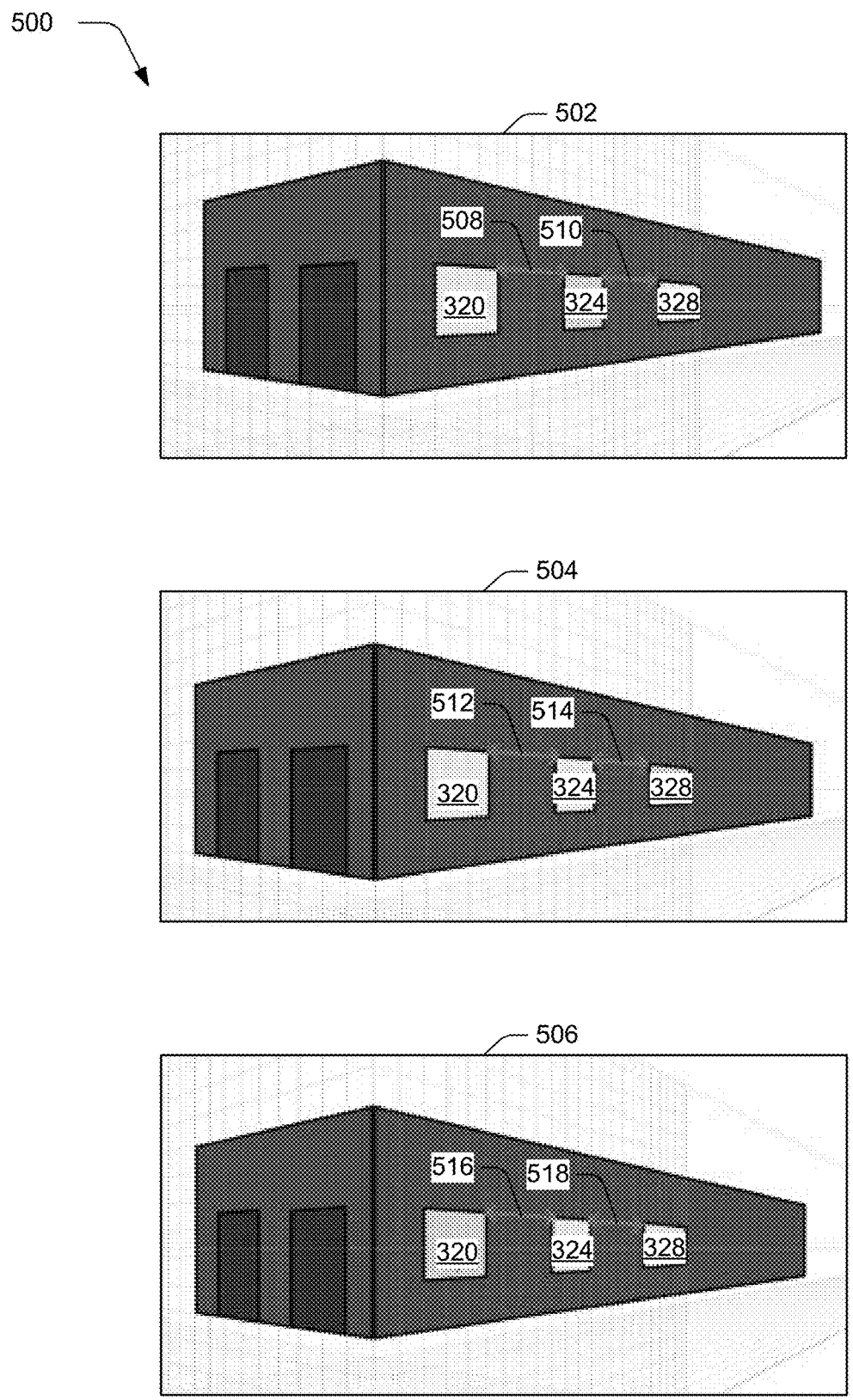
FIG. 5 illustrates a representation of spacing guides for objects in perspective views.

For instance, the guide module 110 and/or the display module 206 implements an equidistant snapping algorithm for generating spacing guides for object in perspective views. In one example, this is representable as:
procedure PERSPECTIVE EQUIDISTANT SNAPPING (s)
B=PERSPECTIVE ALIGNMENT BIN CREATION(s)
for each line segment 1 representing each side of perspective bounding box of S in transformation do
SegmentsInToleranceZone=EXTRACT SEGMENTS IN TOLARANCE ZONE (s,B)
segs=SORTING AND SEGREGATING (SegmentsInToleranceZone,s)
Combination(LMR)=ALGORITHM FOR EQUISPACING ON BOTH SIDES
If combination not found, then Combination(LMR)=ALGORITHM FOR EQUISPACING ON ONE SIDE
If combination is found, do snapping and show snapping hints FIG. 5 illustrates a representation 500 of spacing guides for objects in perspective views. As shown, the representation 500 includes examples 502-506 of spacing guides generated for the objects 320, 324, 328. In example 502, the user interacts with the input device to manipulate the object 324 relative to the objects 320, 328 in the digital artwork example 304. For instance, the display module 206 determines that a perspective distance between the right side of the object 320 and the left side of the object 324 is equivalent to a perspective distance between the right side of the object 324 and the left side of the object 328. In some examples, the display module 206 determines that a perspective distance between the right side of the object 320 and a midpoint of the object 324 is equivalent to a perspective distance between the midpoint of the object 324 and the left side of the object 328. For example, in response to such a determination, the display module 206 generates a spacing guide 508 between the object 320 and the object 324 and a spacing guide 510 between the object 324 and the object 328.

In example 504, the user interacts with the input device to manipulate the object 320 relative to the objects 324, 328 in the digital artwork example 304. In this example, the display module 206 determines that a perspective distance between the right side of the object 320 and the left side of the object 324 is equivalent to a perspective distance between the right side of the object 324 and the left side of the object 328. In response to this determination, the display module 206 generates a spacing guide 512 between the object 320 and the object 324 and a spacing guide 514 between the object 324 and the object 328. Similarly, in example 506, the user interacts with the input device to manipulate the object 328 relative to the objects 320, 324 in the digital artwork example 304. In this example, the display module 206 determines that a perspective distance between the left side of the object 328 and the right side of the object 324 is equivalent to a perspective distance between the left side of the object 324 and the right side of the object 320. In response to this determination, the display module 206 generates a spacing guide 516 between the object 320 and the object 324 and a spacing guide 518 between the object 324 and the object 328.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable individually, together, and/or combined in different ways. Thus, individual functionality, features, and concepts described in relation to different example environments, devices, components, figures, and procedures herein are usable in any suitable combinations and are not limited to the particular combinations represented by the enumerated examples in this description.

Example Procedures

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-5. FIG. 6 is a flow diagram depicting a procedure 600 in an example implementation in which groups of line segments of perspective bounding boxes are determined and an indication of a guide is generated for display in a user interface.

Groups of line segments of perspective bounding boxes of objects displayed in a user interface of a digital content editing application are determined (block 602). The computing device 102 implements the guide module 110 to determine the groups of line segments in some examples. Interaction data describing a user interaction with a particular object of the objects displayed in the user interface is received (block 604). For example, the computing device 102 implements the guide module 110 to receive the interaction data.

A particular group of the groups of line segments is identified based on a line segment of a perspective bounding box of the particular object (block 606). In an example, the guide module 110 identifies the particular group of the groups of line segments. An indication of a guide is generated for display in the user interface based on the line segment and a first line segment included in the particular group (block 608). For example, the guide module 110 generates the indication of the guide for display in the user interface.

Figure 7A:
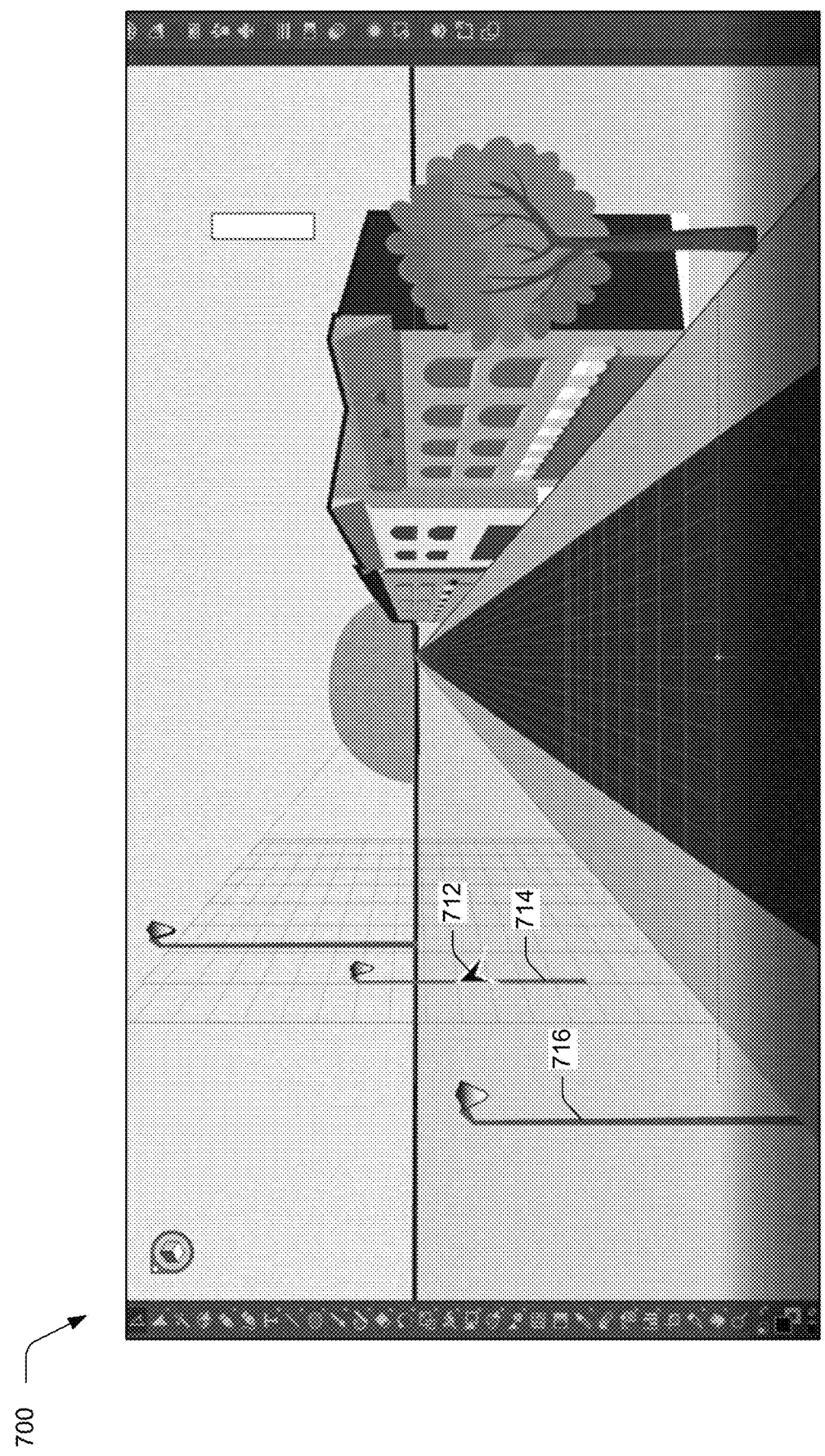
FIGS. 7A, 7B, 7C, 7D, 7E, and 7F illustrate an example of a user interface for generating spacing guides for objects in perspective views.
Figure 7B:
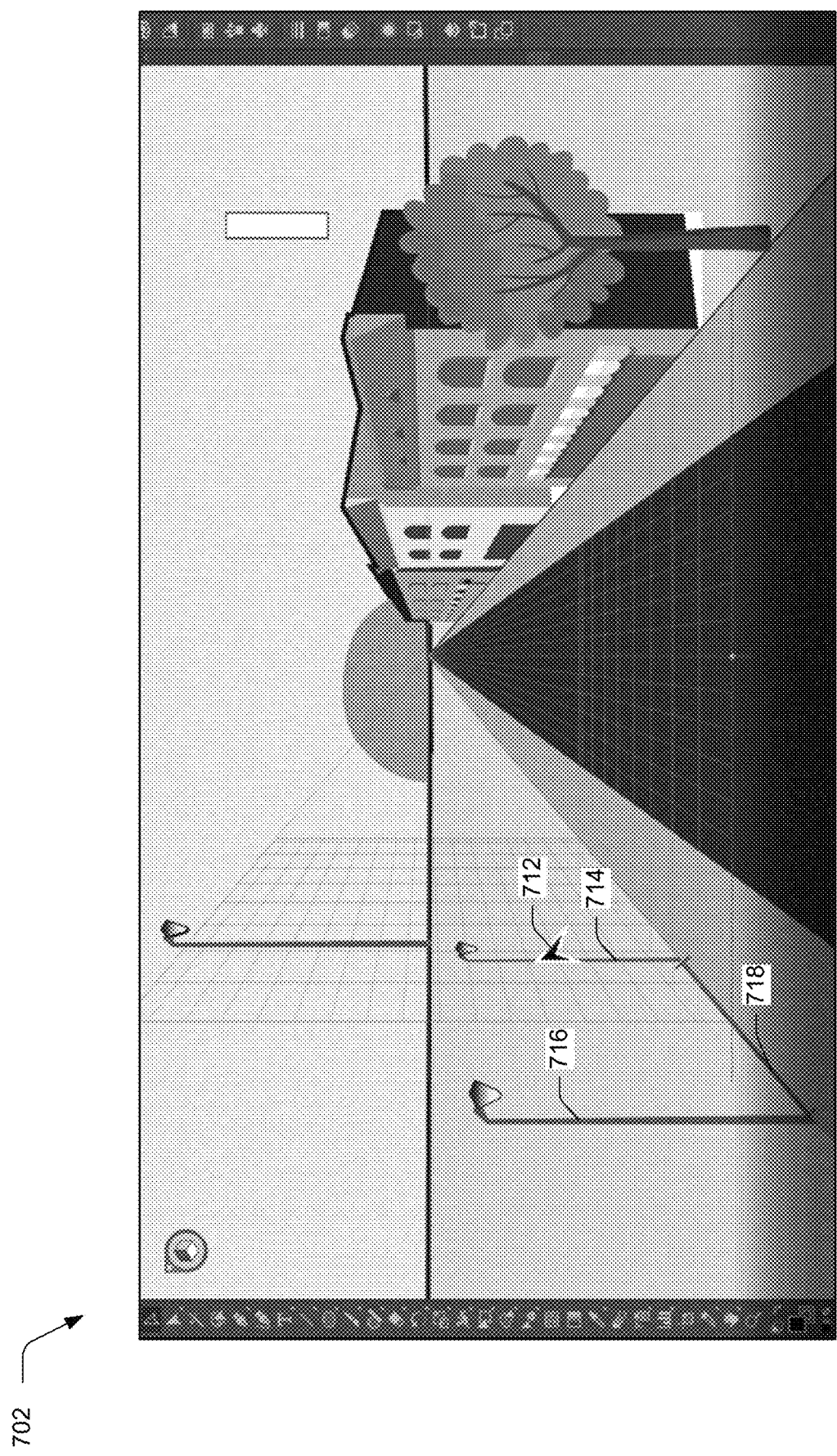
Figure 7C:
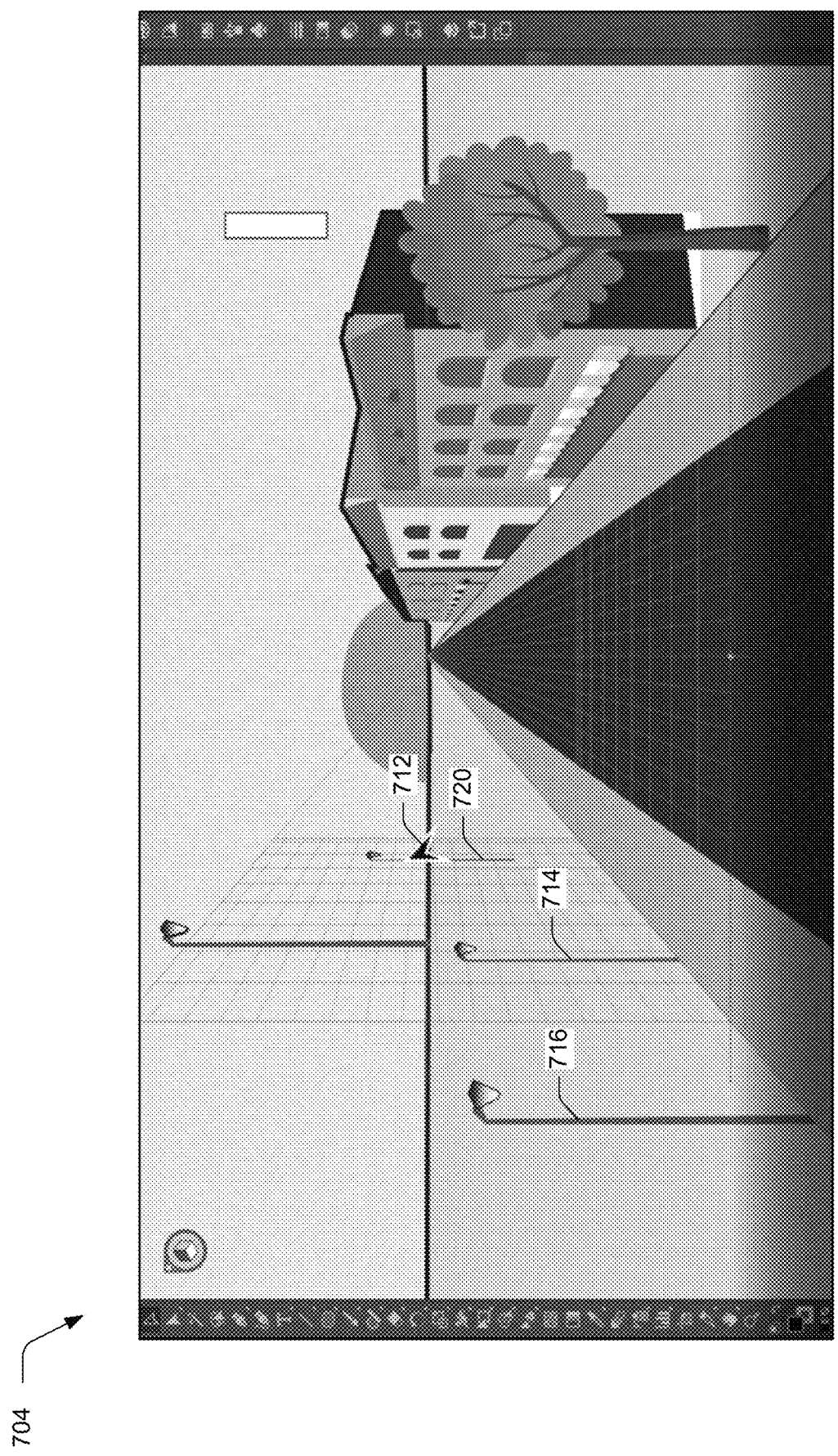
Figure 7D:
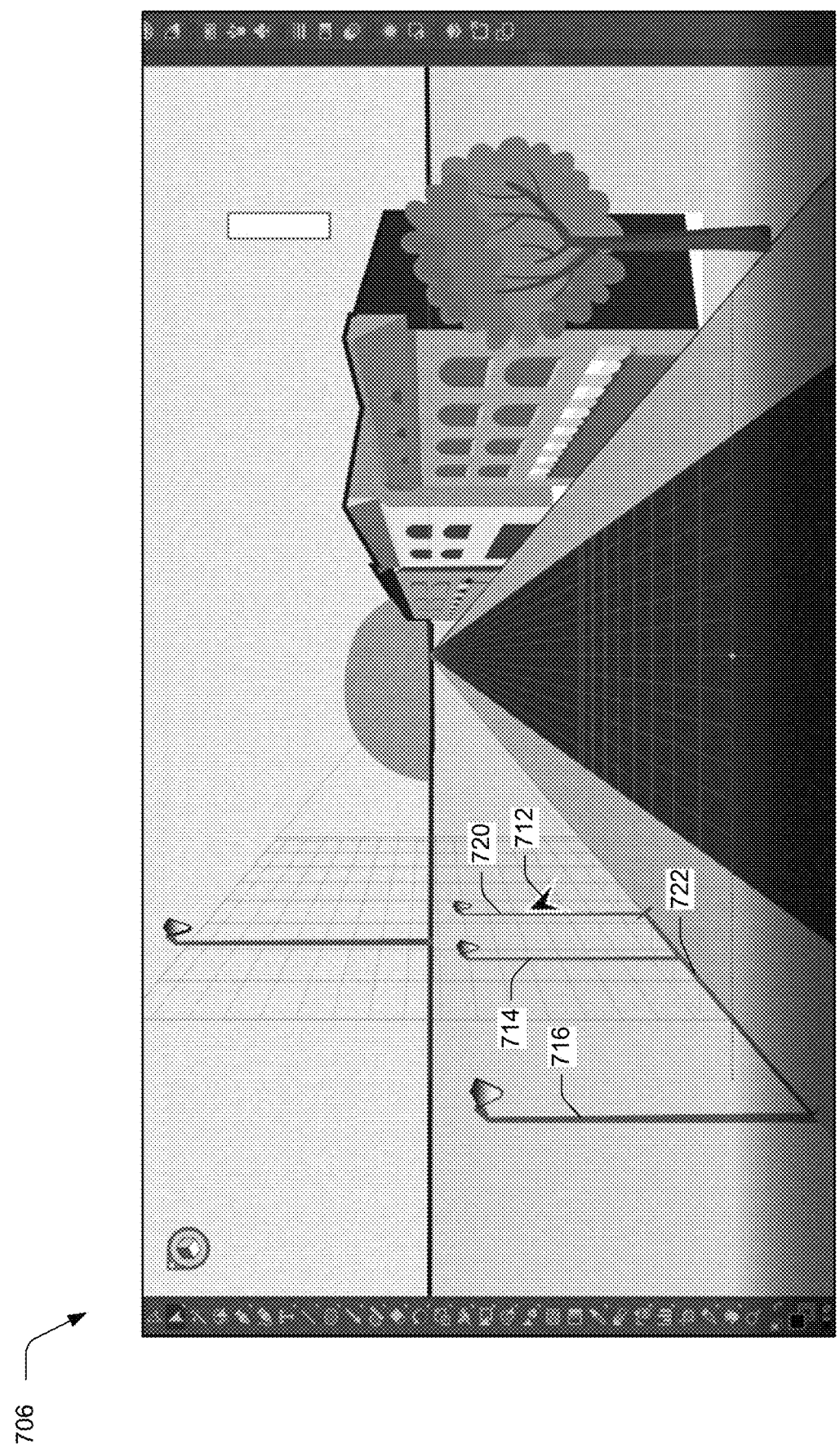
Figure 7E:
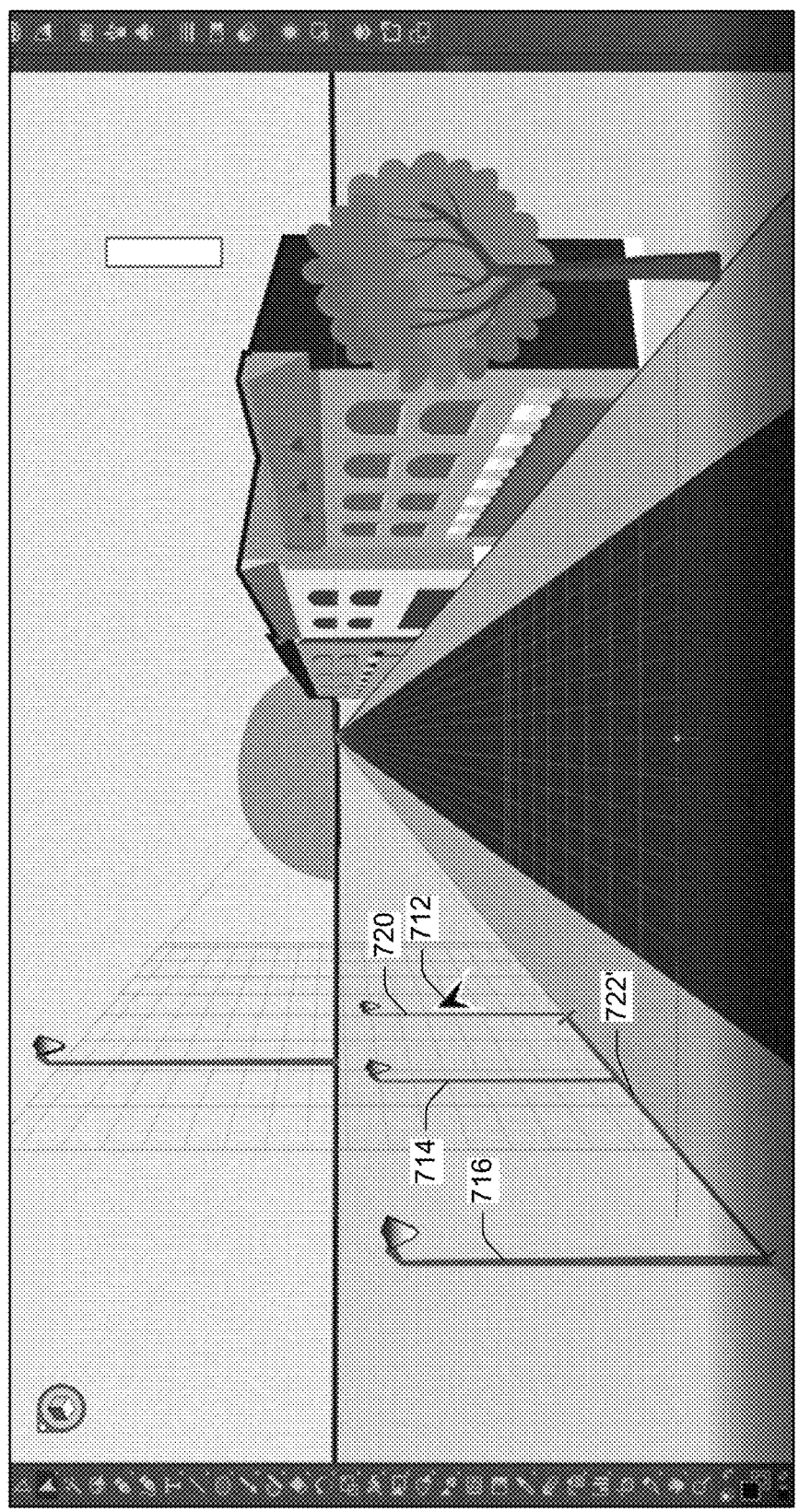
Figure 7L:
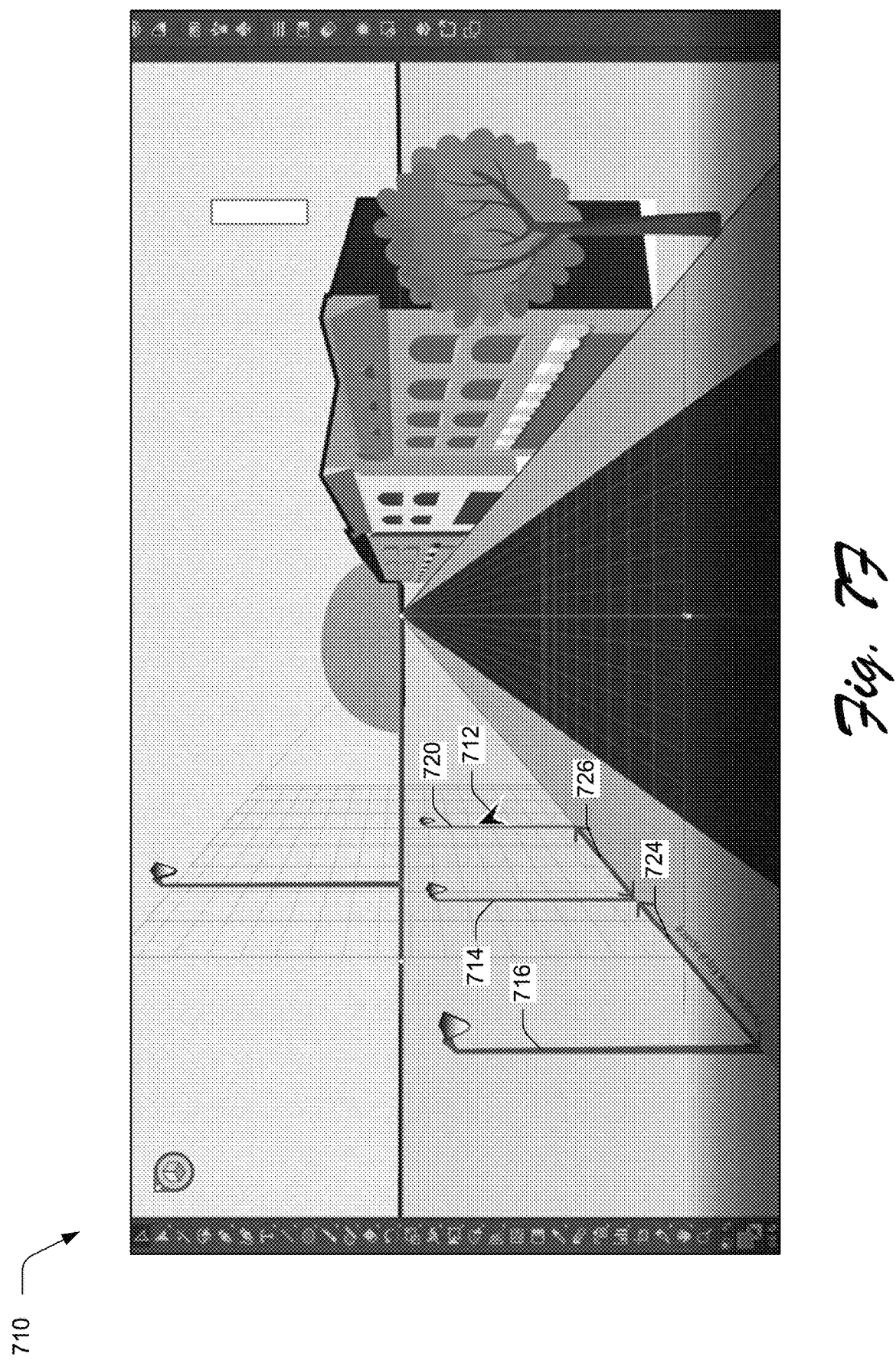

FIGS. 7A, 7B, 7C, 7D, 7E, and 7F illustrate an example of a user interface for generating spacing guides for objects in perspective views. FIG. 7A illustrates a representation 700 of a user interaction with a first object depicted in digital artwork displayed in the user interface as having a perspective view. FIG. 7B illustrates a representation 702 of a manipulation of the first object relative to a second object depicted in the digital artwork displayed in the user interface. FIG. 7C illustrates a representation 704 of a user interaction with a third object depicted in the digital artwork displayed in the user interface. FIG. 7D illustrates a representation 706 of a manipulation of the third object relative to the first object and the second object depicted in the digital artwork displayed in the user interface. FIG. 7E illustrates a representation 708 of a further manipulation of the third object relative to the first object and the second object depicted in the digital artwork displayed in the user interface. FIG. 7F illustrates a representation 710 of spacing guides displayed between the second object and the first object and between the first object and the third object depicted in the digital artwork displayed in the user interface.

With reference to FIG. 7A, the representation 700 includes a cursor 712 and a user interacts with an input device (e.g., a mouse, a stylus, a touchscreen, a microphone, a keyboard, etc.) relative to the user interface to manipulate the cursor 712 in the user interface. As shown, the user interacts with the input device to select a first object 714 displayed in the user interface using the cursor 712. After selecting the first object 714, the user further interacts with the input device to manipulate the first object 714 relative to a second object 716 displayed in the user interface. For instance, the user interface depicts a perspective view of a street and the first and second objects 714, 716 are streetlights which the user is disposing along the street in the perspective view.

With reference to FIG. 7B, the guide module 110 receives the interaction data 126 describing the user's manipulation of the first object 714 and compares coordinates of a perspective bounding box of the first object 714 with coordinates of a perspective bounding box of the second object 716. Based on this comparison, the guide module 110 generates an alignment indication 718 which is displayed between the first object 714 and the second object 716 in the user interface. For example, the alignment indication 718 indicates to the user that the first and second objects 714, 716 are aligned in the perspective view.

As shown in FIG. 7C, the representation 707 includes the cursor 712 and the user interacts with the input device to select a third object 720 displayed in the user interface using the cursor 712. For instance, the third object 720 is an additional streetlight and the user manipulates the third object 720 to align the third object 720 with the first and second objects 714, 716 in the perspective view. The guide module 110 receives the interaction data 126 describing the user's manipulation of the third object 720.

As shown in FIG. 7D, the guide module 110 processes the interaction data 126 to compare coordinates of a perspective bounding box of the third object 720 with the coordinates of the perspective bounding box of the first object 714 and the coordinates of the perspective bounding box of the second object 716. Based on this comparison, the guide module 110 generates an alignment indicator 722 which is displayed in the user interface to indicate that the first, second, and third objects 714, 716, 720 are aligned in the perspective view. The user continues to interact with the input device to manipulate the third object 720 relative to the first and second objects 714, 716 in the user interface.

With reference to FIG. 7E, the guide module 110 generates an alignment indicator 722' which is displayed in the user interface to indicate that the manipulated third object 720 is still aligned with the first and second objects 714, 716 in the perspective view. The user continues to interact with the input device to increase a distance between the first object 714 and the third object 720 in the user interface. The guide module 110 receives the interaction data 126 describing the user's continued interaction with the input device and the guide module 110 processes the interaction data 126 to compare coordinates of the perspective bounding boxes of the first, second, and third objects 714, 716, 720.

As shown in FIG. 7F, the guide module 110 determines that a perspective distance between the second object 716 and the first object 714 is equivalent to a perspective distance between the first object 714 and the third object 720. Based on this determination, the guide module 110 generates a spacing guide 724 between the second object 716 and the first object 714 and a spacing guide 726 between the first object 714 and the third object 720. In the illustrated example, the spacing guides 724, 726 are displayed in the user interface to indicate that the perspective distance between the second and first objects 716, 714 is equivalent to the perspective distance between the first and third objects 714, 720.

Example System and Device

Figure 8:
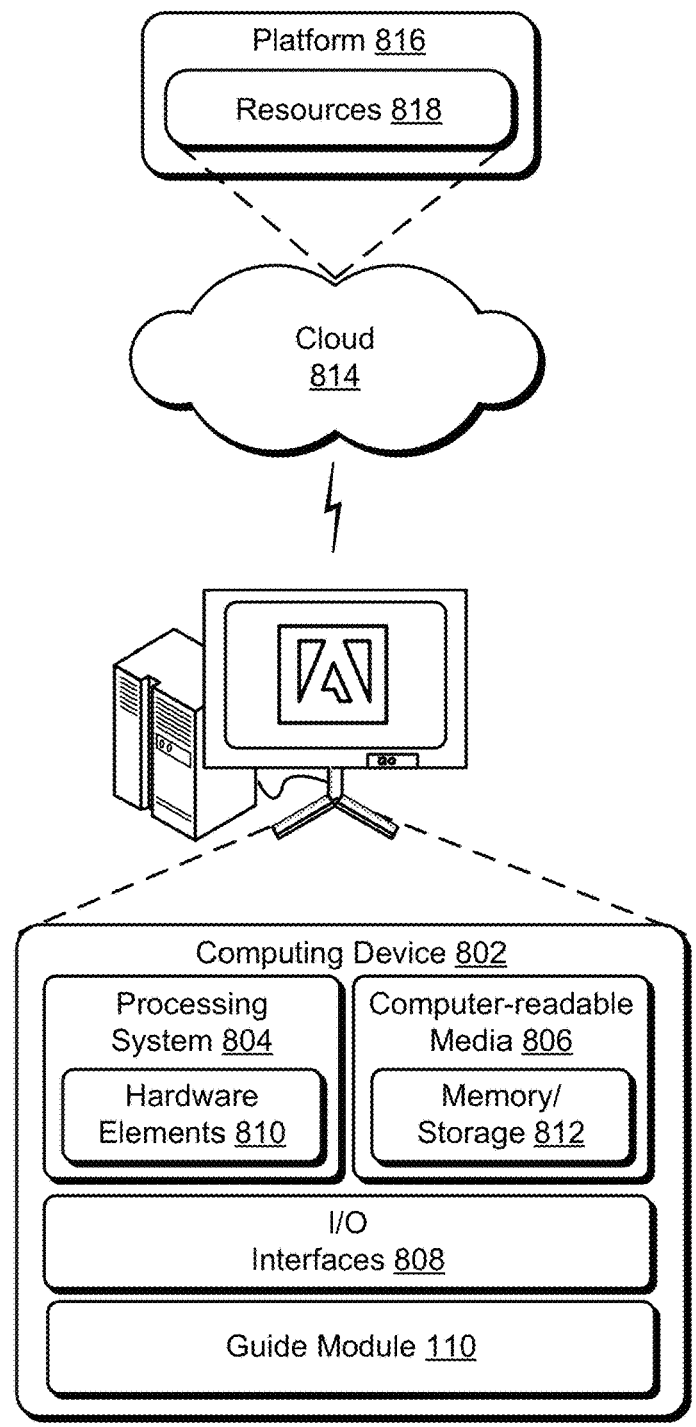
FIG. 8 illustrates an example system that includes an example computing device that is representative of one or more computing systems and/or devices for implementing the various techniques described herein.

FIG. 8 illustrates an example system 800 that includes an example computing device that is representative of one or more computing systems and/or devices that are usable to implement the various techniques described herein. This is illustrated through inclusion of the guide module 110. The computing device 802 includes, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interfaces 808 that are communicatively coupled, one to another. Although not shown, the computing device 802 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that are configured as processors, functional blocks, and so forth. This includes example implementations in hardware as an application specific integrated circuit or other logic device formed using one or more semiconductors. The hardware elements 810 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 806 is illustrated as including memory/storage 812. The memory/storage 812 represents memory/storage capacity associated with one or more computer-readable media. In one example, the memory/storage 812 includes volatile media (such as random access memory (RAM)) and/or nonvolatile media (such as read only memory (ROM), Flash memory, optical disks, magnetic disks, and so forth). In another example, the memory/storage 812 includes fixed media (e.g., RAM, ROM, a fixed hard drive, and so on) as well as removable media (e.g., Flash memory, a removable hard drive, an optical disc, and so forth). The computer-readable media 806 is configurable in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that is accessible to the computing device 802. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 802, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 810. For example, the computing device 802 is configured to implement particular instructions and/or functions corresponding to the software and/or hardware modules. Accordingly, implementation of a module that is executable by the computing device 802 as software is achieved at least partially in hardware, e.g., through use of computer-readable storage media and/or hardware elements 810 of the processing system 804. The instructions and/or functions are executable/operable by one or more articles of manufacture (for example, one or more computing devices 802 and/or processing systems 804) to implement techniques, modules, and examples described herein.

The techniques described herein are supportable by various configurations of the computing device 802 and are not limited to the specific examples of the techniques described herein. This functionality is also implementable entirely or partially through use of a distributed system, such as over a "cloud" 814 as described below.

The cloud 814 includes and/or is representative of a platform 816 for resources 818. The platform 816 abstracts underlying functionality of hardware (e.g., servers) and software resources of the cloud 814. For example, the resources 818 include applications and/or data that are utilized while computer processing is executed on servers that are remote from the computing device 802. In some examples, the resources 818 also include services provided over the Internet and/or through a subscriber network, such as a cellular or Wi-Fi network.

The platform 816 abstracts the resources 818 and functions to connect the computing device 802 with other computing devices. In some examples, the platform 816 also serves to abstract scaling of resources to provide a corresponding level of scale to encountered demand for the resources that are implemented via the platform. Accordingly, in an interconnected device embodiment, implementation of functionality described herein is distributable throughout the system 800. For example, the functionality is implementable in part on the computing device 802 as well as via the platform 816 that abstracts the functionality of the cloud 814.

CONCLUSION

Although implementations of systems for generating spacing guides for objects in perspective views have been described in language specific to structural features and/or methods, it is to be understood that the appended claims are not necessarily limited to the specific features or methods described. Rather, the specific features and methods are disclosed as example implementations of systems for generating spacing guides for objects in perspective views, and other equivalent features and methods are intended to be within the scope of the appended claims. Further, various different examples are described and it is to be appreciated that each described example is implementable independently or in connection with one or more other described examples.

What is claimed is:

1. A method comprising:
   determining, by a processing device, groups of line segments of perspective bounding boxes of objects displayed in a user interface of a digital content editing application;
   receiving, by the processing device, interaction data describing a user interaction with a particular object of the objects displayed in the user interface;
   identifying, by the processing device, a particular group of the groups of line segments based on a line segment of a perspective bounding box of the particular object; and
   generating, by the processing device, an indication of a guide for display in the user interface based on the line segment and a first line segment included in the particular group.

2. The method as described in claim 1, wherein the first line segment is disposed on a first side of the line segment in the user interface and wherein the guide indicates that a perspective distance between the first line segment and the line segment is equivalent to a perspective distance between the line segment and a second line segment that is disposed on a second side of the line segment in the user interface.

3. The method as described in claim 1, wherein the line segment is disposed on a first side of the first line segment in the user interface and wherein the guide indicates that a perspective distance between the first line segment and the line segment is equivalent to a perspective distance between the first line segment and a second line segment that is disposed on a second side of the first line segment in the user interface.

4. The method as described in claim 1, wherein line segments of the perspective bounding boxes of the objects are included in the groups of line segments based on angles between the line segments of the perspective bounding boxes of the objects and a central line passing through a vanishing point in the user interface.

5. The method as described in claim 1, wherein the particular group is identified based on an angle between the line segment and a central line passing through a vanishing point in the user interface.

6. The method as described in claim 1, wherein the guide indicates that a first perspective distance between the first line segment and the line segment is equivalent to a second perspective distance between at least one of the line segment or the first line segment and a second line segment.

7. The method as described in claim 6, wherein a length of the first perspective distance in the user interface is not equal to a length of the second perspective distance in the user interface.

8. The method as described in claim 1, further comprising:
   determining a first set of line segments of the perspective bounding boxes of the objects that are disposed on a first side of a vanishing point in the user interface;
   determining a second set of the line segments of the perspective bounding boxes of the objects that are disposed on a second side of the vanishing point in the user interface; and
   generating the indication of the guide based on at least one of the first set or the second set.

9. A system comprising:
   a bounding box module implemented by one or more processing devices to determine groups of line segments of perspective bounding boxes of objects displayed in a user interface of a digital content editing application;
   a spacing module implemented by the one or more processing devices to:
      receive interaction data describing a user interaction with a particular object of the objects displayed in the user interface;
      identify a particular group of the groups of line segments based on a line segment based on a line segment of a perspective bounding box of the particular object; and
   a display module implemented by the one or more processing devices to generate an indication of a guide for display in the user interface based on the line segment and a first line segment included in the particular group.

10. The system as described in claim 9, wherein the line segment is disposed on a first side of the first line segment in the user interface and wherein the guide indicates that a perspective distance between the first line segment and the line segment is equivalent to a perspective distance between the first line segment and a second line segment that is disposed on a second side of the first line segment in the user interface.

11. The system as described in claim 9, wherein the first line segment is disposed on a first side of the line segment in the user interface and wherein the guide indicates that a perspective distance between the first line segment and the line segment is equivalent to a perspective distance between the line segment and a second line segment that is disposed on a second side of the line segment in the user interface.

12. The system as described in claim 9, wherein the particular group is identified based on an angle between the line segment and a central line passing through a vanishing point in the user interface.

13. The system as described in claim 9, wherein the guide indicates that a first perspective distance between the first line segment and the line segment is equivalent to a second perspective distance between at least one of the line segment or the first line segment and a second line segment.

14. The system as described in claim 13, wherein a length of the first perspective distance in the user interface is not equal to a length of the second perspective distance in the user interface.

15. A non-transitory computer-readable storage medium storing executable instructions, which when executed by a processing device, cause the processing device to perform operations comprising:
   determining angles between line segments of perspective bounding boxes of objects displayed in a user interface and a central line passing through a vanishing point in the user interface;
   receiving interaction data describing a user interaction with a particular object of the objects displayed in the user interface;
   identifying a first line segment of the line segments of the perspective bounding boxes based on an angle between a line segment of a perspective bounding box of the particular object and the central line passing through the vanishing point in the user interface; and
   generating an indication of a guide for display in the user interface based on the line segment and the first line segment.

16. The non-transitory computer-readable storage medium as described in claim 15, wherein the guide indicates that a first perspective distance between the first line segment and the line segment is equivalent to a second perspective distance between at least one of the line segment or the first line segment and a second line segment of the line segments of the perspective bounding boxes.

17. The non-transitory computer-readable storage medium as described in claim 16, wherein a length of the first perspective distance in the user interface is not equal to a length of the second perspective distance in the user interface.

18. The non-transitory computer-readable storage medium as described in claim 15, wherein the first line segment is disposed on a first side of the line segment in the user interface and wherein the guide indicates that a perspective distance between the first line segment and the line segment is equivalent to a perspective distance between the line segment and a second line segment that is disposed on a second side of the line segment in the user interface.

19. The non-transitory computer-readable storage medium as described in claim 15, wherein the line segment is disposed on a first side of the first line segment in the user interface and wherein the guide indicates that a perspective distance between the first line segment and the line segment is equivalent to a perspective distance between the first line segment and a second line segment that is disposed on a second side of the first line segment in the user interface.

20. The non-transitory computer-readable storage medium as described in claim 15, wherein the operations further comprise:
   determining groups of the line segments of the perspective bounding boxes based on the angles; and
   identifying the first line segment based on a group of the groups that includes the angle between a line segment and the central line passing through the vanishing point in the user interface.

* * * * *